United States Patent [19]

Lawler

[11] Patent Number: 5,628,851

[45] Date of Patent: May 13, 1997

[54] METHOD OF MAKING AND INSTALLING A TUB CAP

[76] Inventor: Bruce L. Lawler, 37 Wayfaring La., Rochester, N.Y. 14612

[21] Appl. No.: 519,676

[22] Filed: Aug. 25, 1995

[51] Int. Cl.⁶ .............................. A47K 3/00; B32B 35/00
[52] U.S. Cl. ........................... 156/98; 156/242; 4/555
[58] Field of Search ........................ 4/555, 556, 538, 4/584; 264/219, 220, 299, 36, 138, 139; 156/245, 242, 94, 88, 71, 250, 256; 29/401.1, 402.01

[56] References Cited

U.S. PATENT DOCUMENTS 4,561,160 12/1985 Nicol et al. .................... 4/555

*Primary Examiner*—Michael W. Ball
*Assistant Examiner*—Michael A. Tolin
*Attorney, Agent, or Firm*—Cumpston & Shaw

[57] ABSTRACT

This invention relates to modifying an existing tub to form a bathtub assembly having a recessed opening in the tub apron to allow easy access to a high walled tub apron for users who are unable to step over the apron of the tub. The initial step in the method is the formation of a plug on the intact tub apron. The plug is removed and is transformed into a custom mold for the tub cap. The tub cap is formed within the mold by applying cap building material to the interior surface of the mold. The cap is allowed to cure and is then removed from the mold. A section of the tub apron is then cut out to form a rough opening upon which the tub cap is securely mounted to allow an access passage into the bathtub.

16 Claims, 5 Drawing Sheets

5,628,851

1

METHOD OF MAKING AND INSTALLING A TUB CAP

FIELD OF INVENTION

This invention relates to modifying an existing bathtub to form a bathtub assembly having a recessed opening in the tub apron to allow easy access to a high walled tub apron for users who are unable to step over the apron of the tub. This invention involves a method for producing a tub cap, removing a cut out section from the tub apron, and installing the cap on the partially cut out tub apron. The tub cap may be composed of fiberglass, polymer, acrylic, ceramic, or any other suitable material and may be inserted on any bathtub of known composition.

BACKGROUND OF THE INVENTION

Traditional bathtubs have high side walls, referred to as tub aprons, to allow the bathtub to hold a large volume of water. However, many people, particularly people who suffer from arthritis, debilitating injuries, handicaps, or a general loss of mobility, cannot enter a high walled bathtub. Many people cannot lift their legs high enough to clear the tub apron and enter the tub. An expensive and time consuming renovation has been to remove the entire bathtub and the surrounding tiles or bathtub enclosure and install a shower stall unit. The present invention eliminates the aforementioned costly renovation by employing a method to form a stylish, finished tub cap to substantially conform to a recessed opening in an existing bathtub.

SUMMARY OF THE INVENTION

The present invention relates to a method for modifying a tub to form a recessed opening in a partially cut out tub apron, comprising the steps of forming a plug on the tub apron at the area to be removed and an adjacent area; making a mold from the plug, the mold having an inside surface conforming to the surface of the apron with a cut out section removed; forming a cap in the mold, the cap conforming to the apron with the cut out section removed; removing the cut out section from the apron; and installing the cap on the partially cut out tub apron. The finished bathtub assembly has a tub apron with a recess having a height less than the height of the apron and a width less than the width of the apron. The tub cap, sized to substantially conform to the recess, is placed in the recess to form a stylish, finished recessed opening in the existing bathtub.

DETAILED DESCRIPTION OF THE INVENTION

Traditional bathtubs have high walls to allow the bathtub to hold a large volume of water. Unfortunately, some people do not have enough mobility to step over the high wall and into the bathtub. The present invention enhances the access to an existing bathtub without requiring the removal of the bathtub or any of the surrounding structural material.

Figure 1:
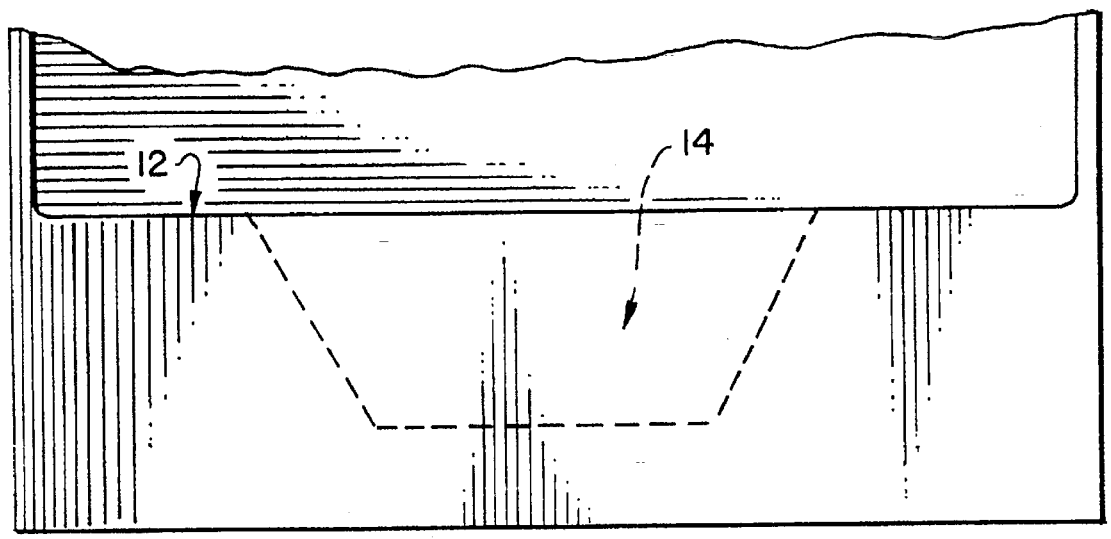
FIG. 1 is a side view of the bathtub with the desired cut out section marked by dotted lines.
Figure 2:
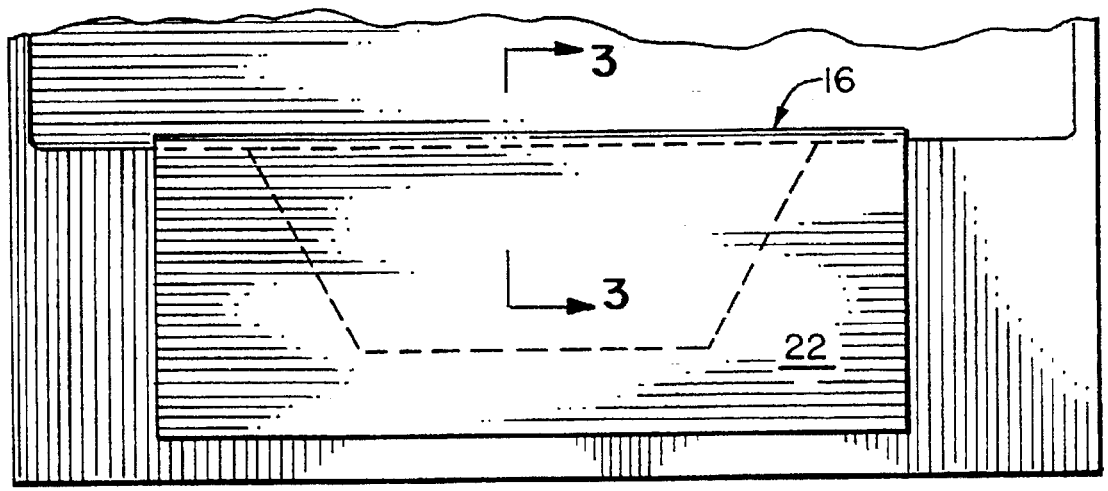
FIG. 2 is a side view of the tub with the plug formed on the tub apron.
Figure 3:
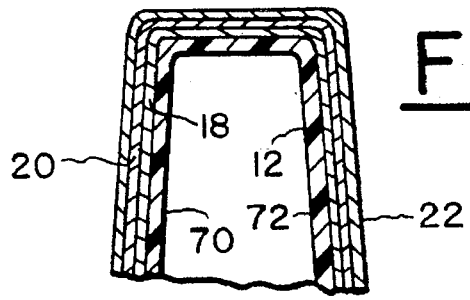
FIG. 3 is a cross-sectional view of the tub apron taken along lines 3–3 of FIG. 2 illustrating the various layers of material used to perform the step of forming the plug.

The method for producing a tub cap begins with evaluating the needs of a particular user of the bathtub. Varying depths and widths of the recessed opening in the cap can be designed according to the desires and needs of the particular user. Once the location of the rough opening on the tub and the dimensions of the cap have been determined (see FIG. 1), one proceeds with the step of forming a plug on the tub apron 12 of the bathtub 10. As shown in FIG. 3, the tub apron 12, having spaced apart inside and outside walls 70 and 72, is initially coated with a barrier agent 18. Preferably, the barrier agent 18 is polyvinyl alcohol and is applied to the tub apron 12 in at least one and preferably three consecutive coatings. After the tub apron 12 is coated with at least one and preferably three coats of the barrier agent 18, at least one and preferably three coats of a mold releasing wax 20 are applied to the tub apron 12. The mold releasing wax 20, which can be any suitable mold releasing wax, is preferably manufactured by F. R. White of Williamson, N.Y.

Figure 4:
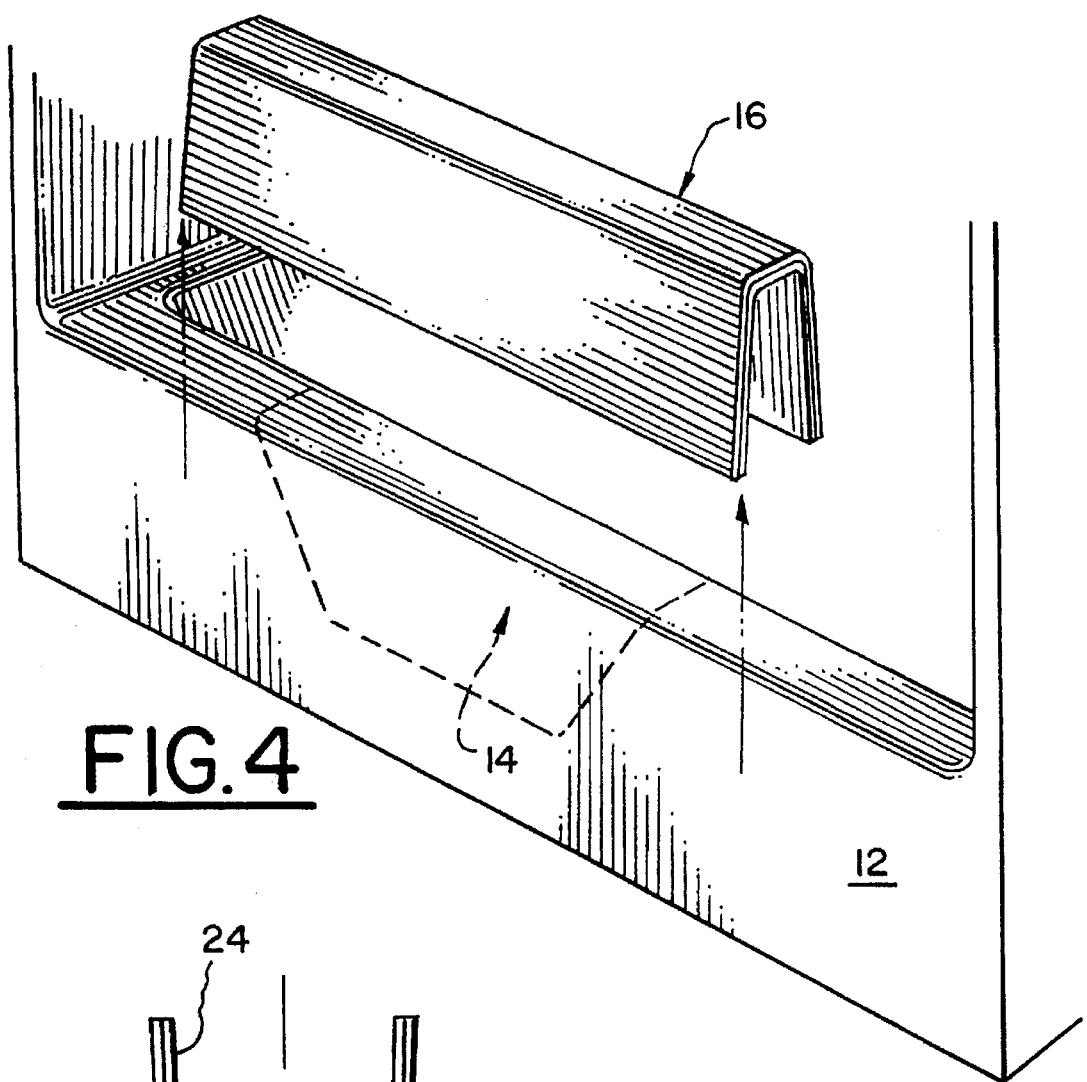
FIG. 4 illustrates the removal of the plug from the tub apron.

After applying the three coats of releasing wax 20, a plug forming material 22 is then applied over the releasing wax 20 on the tub apron 12 to form the plug 16. The plug forming material 22 is applied in three consecutive coatings and allowed to cure for approximately twenty minutes. The plug forming material 22 preferably consists of a mixture of polyester resins and methyl ethyl ketone(MEK) with a layer of fiberglass matting cloth, preferably a 1.5 oz. cloth, laid over the mixture. The plug forming material 22 is then allowed to cure to form the plug 16. Typically, the plug forming material 22 cures in approximately twenty minutes to one hour. After the plug forming material 22 has hardened or cured, the plug 16 is then removed from the tub apron 12, as shown in FIG. 4.

Figure 5:
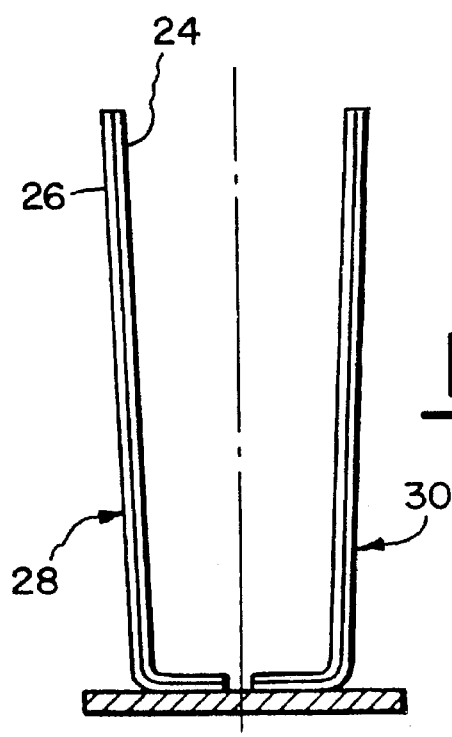
FIG. 5 is an end view of the two halves of the plug mounted and supported in a spaced apart orientation.
Figure 6:
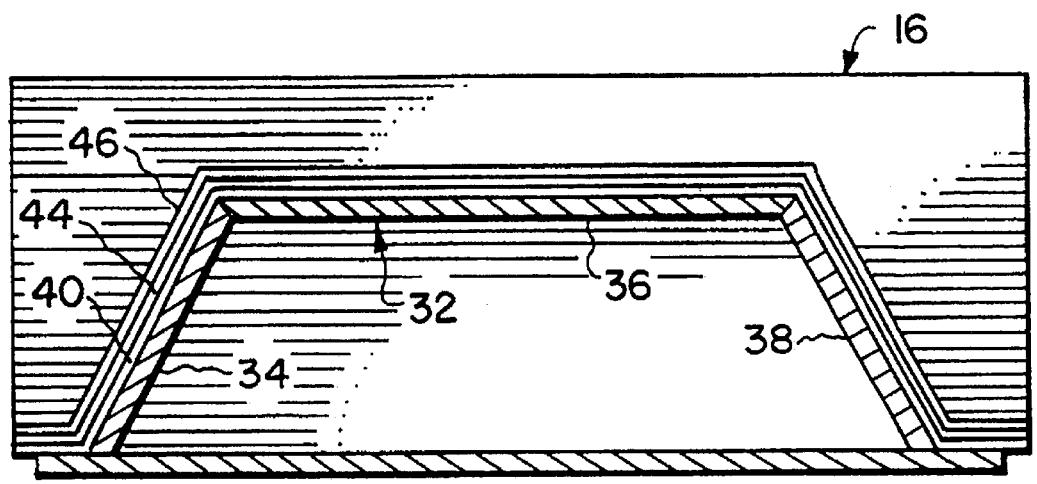
FIG. 6 is a side view of the plug illustrating the baffle and the application of the materials needed to form the mold.
Figure 7:
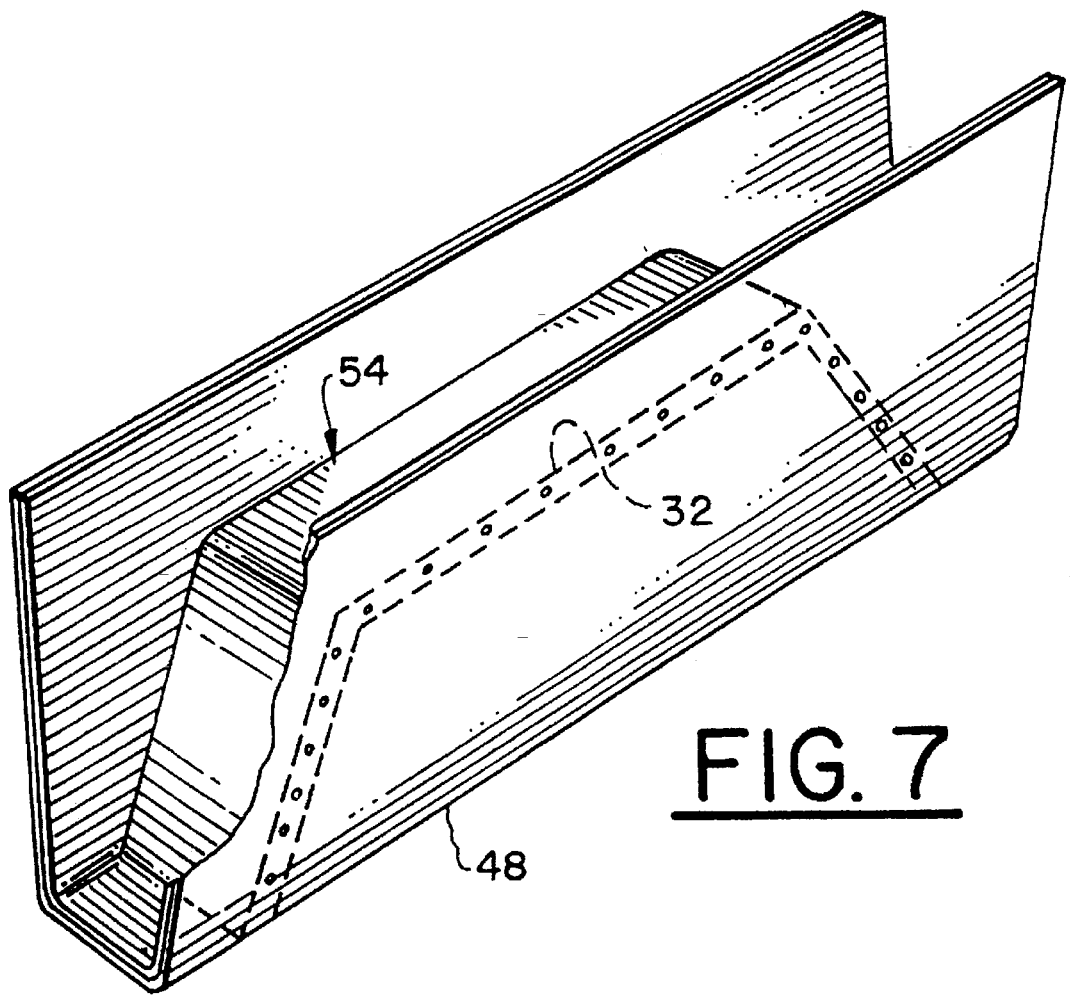
FIG. 7 illustrates the finished mold.

The next step involves making the mold in which the tub cap will be formed. The plug 16, which has inside and outside surfaces 24, 26, is flipped upside down and divided into two halves 28, 30 along its longitudinal axis (see FIG. 5). The two halves 28, 30 are then supported in a spaced apart orientation by securing the two halves on a supporting device, preferably a sheet of plywood. Preferably, the two halves 28, 30 are spaced ⅝" apart to make the inside dimension of the mold correspond substantially to the outside dimensions of the tub apron. As illustrated in FIGS. 6 and 7, a baffle 32 is then formed between the plug halves 28, 30 in the shape of the cut out section 14 to be created in the tub apron 12. The baffle 32 may be formed by cutting and fitting three pieces of pine wood 34, 36, 38 or any other suitable building material onto the inside surface 24 of the plug 16. Referring to FIG. 7, the building material is then fastened to the sides of the plug 16. As depicted in FIG. 6, a filling compound 40 is applied to the inside surface 24 of the plug 16 to fill any gaps between the baffle 32 and the interior surface 24 of the plug 16. The filling compound 40 can be any suitable body filler. The filling compound 40 is added to provide a continuous, uninterrupted surface having an inside dimension corresponding substantially to the outside dimensions of the tub apron 12 in which the cut out 14 is to be created. Upon hardening, the filling compound 40 is sanded to a desired smoothness to obtain a rough mold.

Next, a primer compound 44 is applied to the rough mold to prime and seal the rough mold. The primer compound 44 is preferably a mixture of Marina Bond gray polyester gel coat, acetone, and methyl ethyl ketone (MEK). The primer compound 44 is typically sanded to a desired smoothness and reapplied if necessary. A finishing compound 46 is then applied over the sanded primer compound 44 to give the mold a shiny, finished surface. Preferably, the finishing compound 46 consists of 8 oz. of Marina Bond red polyester resin, 8 oz. of styrene, 16 drops of MEK and 4 oz. of acetone and is sprayed onto the rough mold. The finishing compound 46 is allowed to cure, usually in three days, to form a finished mold 48 having substantially the same inside dimensions as the tub apron 12 with the desired cut out 14 formed therein (see FIG. 7).

Figure 8:
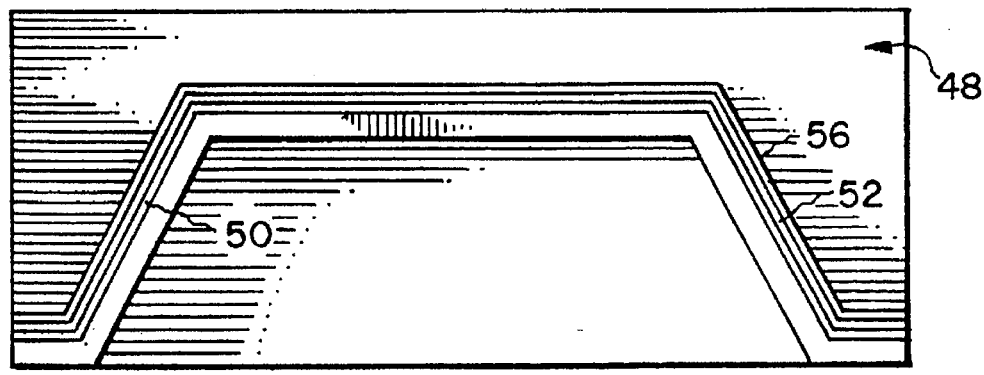
FIG. 8 depicts the step of building the cap within the mold.
Figure 9:
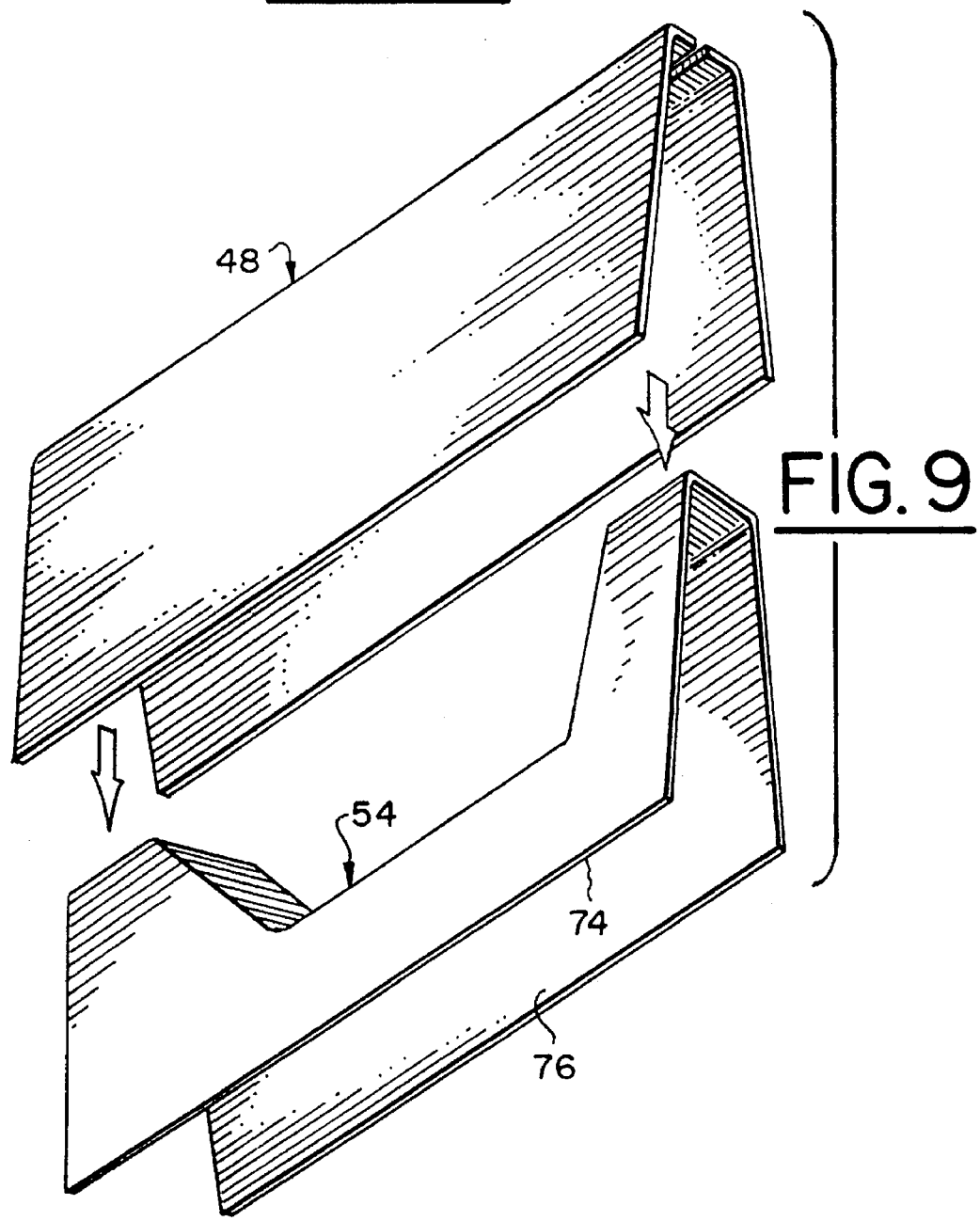
FIG. 9 illustrates the step of removing the cap from the mold.
Figure 10:
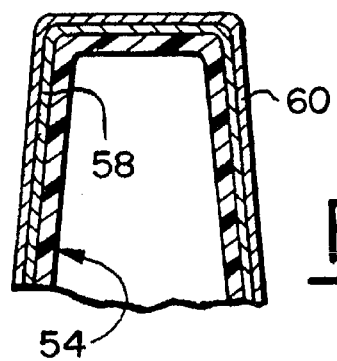
FIG. 10 is an end view depicting the layers of materials used to form the finished mold.

The cap is then formed within the mold. Referring to FIG. 8, the finished mold 48 is initially waxed with a mold releasing wax 50, preferably three times. The mold releasing wax 50 can be any suitable releasing wax. The finished mold 48 is then sprayed with a cap forming material 52 which is preferably a mixture of 8 oz. of styrene, 8 oz. of Marina Bond polyester gel coat, 16 drops of methyl ethyl ketone peroxide, and approximately 5 oz. of acetone. The cap forming material 52 is then allowed to cure for approximately twenty minutes. Once the cap forming material 52 hardens into a rough cap 54, a cap body building material 56 is applied to the rough cap to add bulk to the cap 54. Preferably, the cap body building material 56 consists of a mixture of polyester resin and methyl ethyl ketone peroxide, and a layer of fiberglass cloth. Any air bubbles which may form during the building of the cap body should be worked out to form a uniform surface. The finishing compound is allowed to cure for approximately one hour and then the rough cap is removed from the mold (see FIG. 9). The rough cap 54 is sized to substantially conform to the recess in the tub apron, having spaced apart walls 74 and 76 spaced apart by a distance greater than the distance between the spaced apart walls of the tub apron 12. The rough cap 54 is then inspected for air pockets and other imperfections. Any deformities are filled in with any suitable body filling compound and then sanded to a desired smoothness. The edges of the rough cap 54 are also sanded to a desired smoothness and appearance. Referring to FIG. 10, the rough cap 54 is then wet-sanded and the surface of the cap is coated with a layer of gel coat 58 to give the rough cap 54 a shiny, glass-like finish. Preferably, the gel coat 58 consists of 50% Marina Bond polyester resin and 50% Duratec styrene. After gel coating, the cap 54 is sprayed with a finishing compound 60 to provide a desired finish, preferably a finish which matches the rest of the tub. The finishing compound 60 has a preferable composition of 8 oz. of polyester gel coat, 8 oz. of styrene, 16 drops of methyl ethyl ketone peroxide and 5 oz. of acetone. The finishing compound 60 is then allowed to cure for approximately twenty minutes to form the finished cap 62.

Figure 11:
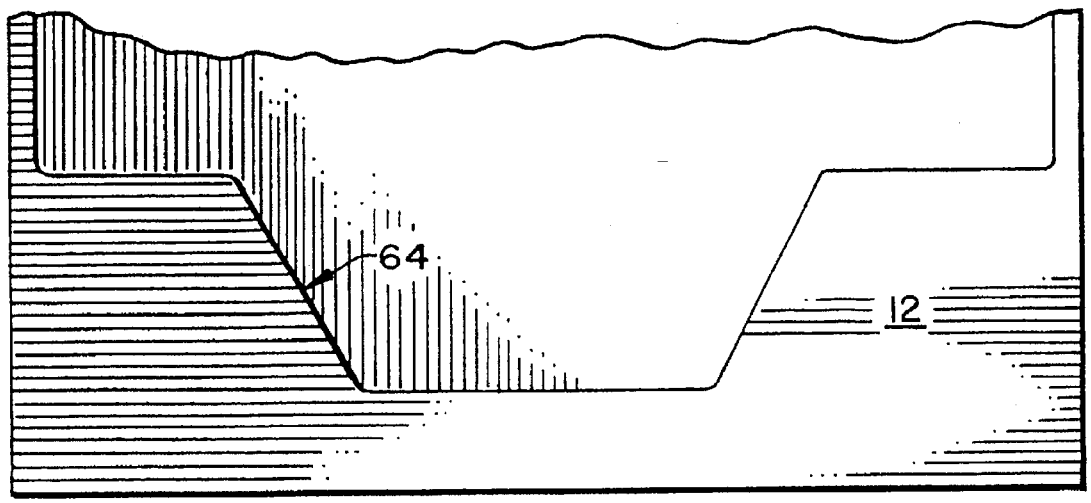
FIG. 11 is a side view of the tub illustrating the recess in the tub apron.
Figure 12:
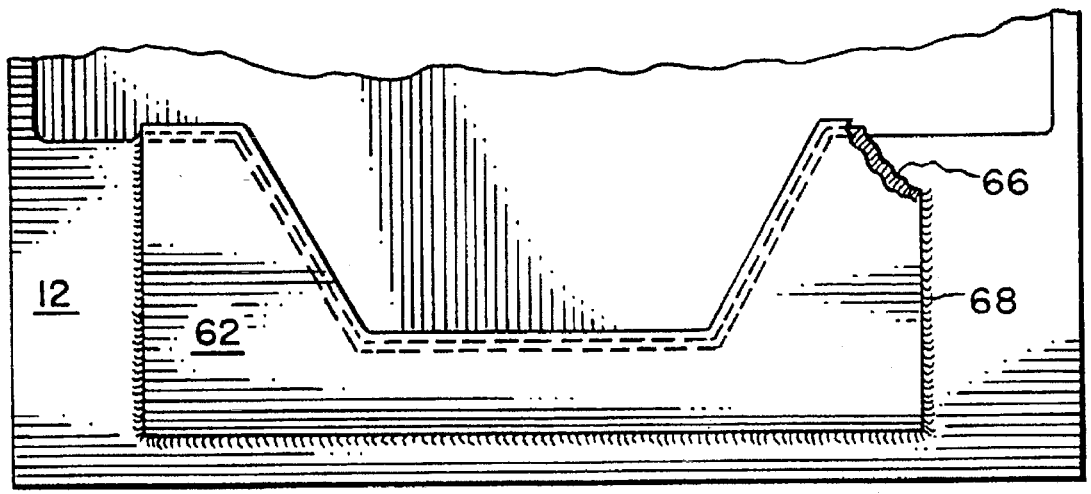
FIG. 12 illustrates the step of installing the cap on the tub apron.

The next step in the process is to cut the tub apron 12 and remove the cut out section 14. The width of the soon to be installed cap is measured and marked from the centerline of the tub apron 12. The depth of the cap must also be measured and marked from the centerline of the tub apron 12. A pilot hole is drilled into the tub apron along one of the cut out markings to facilitate the entry of a jig saw blade. The tub apron 12 is cut out along the predetermined markings and then the cut out section 14 is removed to form the opening or recess 64 therein (see FIG. 11 ). The recess has a height less than the height of the apron 12 and a width less than the width of the apron 12. The finished cap 62 is set over the recess 64 and the tub apron 12 for a trial fitting. The cap 62 is removed and, if necessary, the apron 12 is scribed to allow the cap to fit securely onto the tub apron 12. As shown in FIG. 12, a layer of an adhesive compound 66 is applied to the underside of the cap 62 and then the cap 62 is mounted onto the tub apron 12. The adhesive compound 66, which can be any suitable adhesive, is allowed to harden between the cap and the apron and secure the cap 62 to the tub apron 12. Typically, pressure is applied to the top of the tub cap 62 to ensure a fight fit while the adhesive 66 is hardening. A bead of sealant 68, which can be any suitable sealant or caulking compound, is then applied along the periphery of the cap where the cap 62 contacts the tub apron 12 to seal the tub cap to the tub apron. The finished structure consists of a bathtub assembly 78 having a tub apron 12 with a recess having a height less than the height of the apron and a width less than the width of the apron. The tub cap 62, sized to substantially conform to the recess, is placed in the recess to form a stylish, finished recessed opening in the existing bathtub.

While a preferred method of the invention has been shown and described with particularity, it will be appreciated that various changes and modifications may suggest themselves to one having ordinary skill in the art upon being apprised of the invention. It is intended to encompass all such changes and modifications as fall within the scope and spirit of the appended claims.

What is claimed is:

1. A method for modifying a tub to form a recessed opening in a partially cut out tub apron, comprising the steps of:

(a.) forming a plug on the tub apron at the area to be removed and an adjacent area;

(b.) making a mold from the plug, the mold having an inside surface conforming to the surface of the apron with a cut out section removed;

(c.) forming a cap in the mold, the cap conforming to the apron with the cut out section removed;

(d.) removing the cut out section from the apron; and (e.) installing the cap on the partially cut out tub apron.

2. The method for modifying a tub as defined in claim 1 wherein the step of forming the plug, having an interior and exterior surface, comprises:

(a.) coating a portion of the tub apron with a barrier agent;

(b.) coating the portion of the tub apron with a mold releasing wax;

(c.) applying a plug forming material to the portion of the tub apron covered by the barrier agent and the mold releasing wax;

(d.) allowing the plug forming material to harden on the tub apron to form a plug; and (e.) removing the plug from the tub apron.

3. The method for modifying a tub as defined in claim 2 wherein the step of applying the releasing agent comprises applying a combination of a barrier agent and a mold releasing wax.

4. The method for modifying a tub as defined in claim 2 wherein the step of applying the barrier agent comprises applying polyvinyl alcohol.

5. The method for modifying a tub as defined in claim 2 wherein the step of forming the plug comprises applying a plug forming material mixture of polyester resins, methyl ethyl ketone peroxide, and fiberglass matting cloth.

6. The method for modifying a tub as defined in claim 1 wherein the step of making the mold comprises:
   (a.) turning the plug upside down and dividing the plug into two halves along its longitudinal axis;
   (b.) mounting the two halves and supporting the two halves in a spaced apart orientation:
   (c.) forming a baffle between the two halves in the shape of the cut out to be created in the tub apron;
   (d.) applying a filling compound to fill any gaps between the baffle and the interior surface of the plug, the filling compound having inside dimensions corresponding substantially to the outside dimensions of the tub apron in which the cut out is to be created;
   (e.) sanding the filling compound to a desired smoothness to obtain a rough mold;
   (f.) applying a primer compound to the rough mold;
   (g.) sanding the primer compound to a desired smoothness;
   (h.) spraying a finishing compound on the rough mold; and
   (i.) allowing the rough mold to harden and cure to form a finished mold having substantially the same inside dimensions as the tub apron with the desired cut out section formed therein.

7. The method for modifying a tub as defined in claim 6 wherein the step of making the mold comprises applying a body filling compound.

8. The method for modifying a tub as defined in claim 6 wherein the step of making the mold comprises applying a primer compound of polyester gel coat.

9. The method for modifying a tub as defined in claim 6 wherein the step of making the mold comprises applying a finishing compound mixture of red polyester resin, styrene, methyl ethyl ketone peroxide, and acetone.

10. The method for modifying a tub as defined in claim 1 wherein the step of forming the cap comprises:
    (a.) waxing the finished mold with a mold releasing wax;
    (b.) spraying the finished mold with a cap forming material;
    (c.) allowing the cap forming material to cure to form a rough cap;
    (d.) applying a cap body building material to the rough cap;
    (e.) allowing the rough cap to cure;
    (f.) removing the rough cap from the mold;
    (g.) sanding the rough cap to a desired smoothness;
    (h.) applying a finishing compound to the rough cap; and
    (i.) allowing the finishing compound to cure to form a finished cap.

11. The method for modifying a tub as defined in claim 10 wherein the step of forming the cap comprises the step of applying styrene, polyester gel coat, methyl ethyl ketone peroxide, and acetone.

12. The method for modifying a tub as defined in claim 11 wherein the step of forming the cap comprises the step of applying polyester resin, methyl ethyl ketone peroxide, and fiberglass cloth.

13. The method for modifying a tub as defined in claim 12 wherein the step of forming the cap comprises the step of applying styrene, polyester gel coat, methyl ethyl ketone, and acetone.

14. The method for modifying a tub as defined in claim 1 wherein the step of installing the cap comprises:
    (a.) removing a predetermined cut out section of the tub apron;
    (b.) applying an adhesive compound to the underside of the finished cap;
    (c.) mounting the finished cap onto the tub apron;
    (d.) allowing the adhesive compound to harden and secure the cap to the tub apron; and
    (e.) applying a sealant along the periphery of the cap where the cap contacts the tub apron.

15. The method for modifying a tub as defined in claim 14 wherein the step of installing the cap comprises the step of applying an adhesive compound.

16. The method for modifying a tub as defined in claim 14 wherein the step of installing the cap comprises the step of applying a sealant.

* * * * *